United States Patent [19]

Soderberg et al.

[11] 4,037,818
[45] July 26, 1977

[54] CONTROL VALVE

[75] Inventors: Roy E. Soderberg; Albert J. Hanssen, both of North Kingstown, R.I.

[73] Assignee: International Telephone and Telegraph Corporation, Nutley, N.J.

[21] Appl. No.: 607,749

[22] Filed: Aug. 26, 1975

[51] Int. Cl.$^2$ .................. F16K 5/10; F16K 47/04
[52] U.S. Cl. .................. 251/121; 251/127; 251/304
[58] Field of Search ............ 251/127, 118, 121, 315, 251/304; 137/625.32, 625.31, 625.3, 614.18, 614.17

[56] References Cited

U.S. PATENT DOCUMENTS

| 3,023,783 | 3/1962 | Vickery | 251/315 X |
|---|---|---|---|
| 3,209,779 | 10/1965 | McGowen, Jr. | 251/118 X |
| 3,526,249 | 9/1970 | Baustian | 251/121 X |
| 3,707,161 | 12/1972 | Crawford | 137/614.17 X |
| 3,722,545 | 3/1973 | Furlani | 137/625.32 X |
| 3,860,032 | 1/1975 | Rogers | 137/614.17 |
| 3,880,191 | 4/1975 | Baumann | 137/625.32 |

FOREIGN PATENT DOCUMENTS

| 858,178 | 12/1952 | Germany | 251/315 |
|---|---|---|---|
| 1,200,688 | 9/1965 | Germany | 251/127 |

Primary Examiner—Arnold Rosenthal
Attorney, Agent, or Firm—John T. O'Halloran; Peter C. Van Der Sluys

[57] ABSTRACT

A rotatable plug of a control valve is supported by trunions journaled along an axis transverse to the direction of flow of a fluid to be controlled and is provided with a flow passage defined in part by a surface having at least one baffle formed thereon for providing desired flow characteristics over the entire range of plug travel.

20 Claims, 8 Drawing Figures

CONTROL VALVE

BACKGROUND OF THE INVENTION

1. Field of the Invention

The present invention relates to flow control valves of the ball or segmented ball type and more particularly to such valves having equal percentage characteristics, i.e. a characteristic wherein a percentage change in ball travel causes an equal percentage change in flow volume at all points on the characteristic curve of the valve.

2. Description of the Prior Art

A ball valve that exhibits an equal percentage characteristic has a number of useful control applications including the control of the recirculating cooling water in nuclear reactors. Heretofore, the recirculating cooling water in a nuclear reactor was controlled using a pair of variable speed pump motor-generator sets to provide particular flow rates and volumes under varying conditions of time, temperature and power demand. Notwithstanding the great expense involved in providing variable speed pump motor-generator sets, it has been found that the accuracy of response of such devices may not be as finely controlled as desired.

With the advent of newer and larger nuclear reactors the pressures and volumes of fluid flow required for the recirculation of cooling water in such reactors necessitated pumps which were extremely large and very expensive.

It was proposed that a ball valve be used to replace the variable speed pump motor-generator sets for providing control of cooling water flow; however, it was discovered that ball valves and segmented ball valves experience a sudden increase in flow rate at some point beyond the three-quarters open position of the valve and in particular in the 89 – 91% of maximum full open range. Thus, use of ball valves in precise control applications has been limited because of the poor control provided and the liklihood of system oscillation. The ball valve was totally unacceptable for use in nuclear power plants since surges in cooling water flow cannot be tolerated in large nuclear reactors.

The ball valve was only acceptable for use in control systems if the ball travel was limited to 80 percent of the maximum available travel. Thus, the valve had to be 25 percent oversized to produce a desired capacity resulting in a substantial increase in cost.

SUMMARY OF THE INVENTION

The present invention contemplates a control valve having a flow characteristic that is of uniform slope and exhibits a minimum slope ratio between adjacent plug positions. The desired characteristics are achieved by the use of a valve plug having a flow passage therethrough which is defined in part by a surface having at least one baffle formed thereon and extending into the flow passage.

After considerable testing it was discovered that the sudden change in fluid flow rate usually occurred at 90 – 91% of maximum valve opening and that the change was repeatable, occurring at the same valve position for both increasing and decreasing flow rates. It was concluded that the change in flow rate was the result of a sudden change in flow efficiency such as that which is experienced when wall attachment takes place. The phenomena could also be the result of Vena Contracta and the changes in jet coefficients that occur as the sharp edged orifice formed in the valve changes to a venturi like passage as the valve opening increases.

The disposition of a single baffle in the flow passage provided sufficient turbulance to prevent wall attachment but the maximum capacity of the valve was severely diminished. The most desirable characteristics were provided when multiple baffles of varying heights or a labyrinth of grooves of varying depths were formed on a surface defining the flow passage.

The main objective of the present invention is to provide a control valve having an equal percentage flow characteristic.

Another objective of the present invention is to provide a control valve having flow characteristics of uniform slope and minimum slope ratios.

A further objective of the present invention is to provide a control valve adapted to control the recirculating cooling water utilized in a nuclear reactor.

Another objective of the present invention is to provide a control valve which will allow for more precise control of the pressure, rate of flow and volume of said cooling water.

Another objective of the present invention is to provide a control valve having the previously mentioned characteristics which is less expensive than those heretofore available.

Further objectives and advantages of the present invention will become apparent by reference to the following description taken in conjunction with the accompanying drawings in which three embodiments are described.

DESCRIPTION OF THE INVENTION

Figure 1:
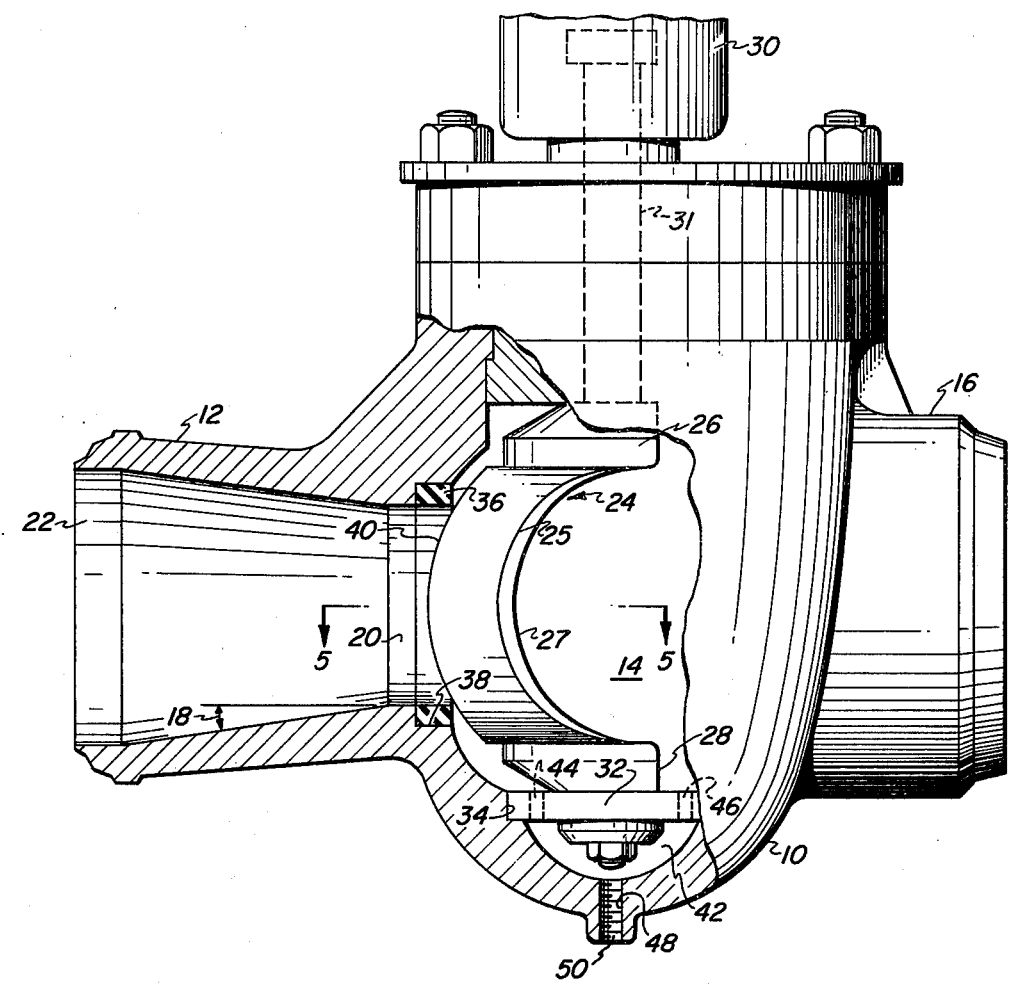
FIG. 1, is a partial cut-away side view of a ball valve constructed in accordance with the present invention.

Referring to FIG. 1, there is shown a cut-away side view of a ball valve having a casing 10 including an inlet pipe 12, a ball chamber 14 and an outlet pipe 16. Inlet pipe 12 has an inner surface that is tapered at an angle 18 of approximately 8½° to 9° and is of such a length that the inner end of the pipe has a circular aperture 20 having a diameter equal to approximately 83% of the diameter of a circular aperture 22 at the outer end of the pipe. A ball plug 24 is rotatably mounted in ball chamber 14 on trunions 26 and 28. Ball plug 24 may be formed as a complete spherical ball with a flow passage formed therethrough or may be in the form of a segmented ball as shown in FIG. 1. Ball plug 24 is coupled to a conventional drive means such as a motor 30 by a shaft 31 for rotating the plug 24 and thereby varying the fluid flow through the valve. Ball plug 24 is further supported in ball chamber 14 by a circular guide plate 32 which is fitted into a circular seat 34 formed in casing 10. A seating ring 36 formed of any standard seating material, for example plastic or metal, is positioned in a circular seat 38 formed in casing 10. A clearance of approximately 0.032 inch is provided between the seating ring 36 and a portion of a substantial spherical surface 40 of ball plug 24. The clearance is provided to prevent binding of the ball plug, especially at extremely high temperatures, as a result of different coefficients of thermal expansion of the different materials used in the valve. Of course the clearance will cause some fluid to flow through the valve in the closed position but the flow is permissible since the valve is intended for use as a control valve and not a shut-off valve.

To provide an area for the collection of waste sediment, which is of extreme importance in nuclear reactors, a trap 42 is provided at a lower-most portion of the valve casing 10. The sediment, which may be radioactive waste material, passes through holes 44 and 46 formed in circular guide plate 32 to be collected in trap 42. A drainage hole 48 is provided in casing 10 and is normally closed with a plug 50 which may be removed at appropriate intervals for removal of the sediment from trap 42.

Ball plug 24 shown in FIG. 1 is known as a segmented ball since only a portion 40 of a spherical surface is provided for closing aperture 20. Since the remainder of the ball would be surplusage it has been eliminated. A flow passage is partially defined by a semi-cylindrical surface 25 formed on the ball plug 24. In FIG. 1 there is shown a baffle 27 formed on surface 25 and extending into the flow passage. The detailed structure of baffle 27 and its function will be discussed subsequently.

Figure 2:
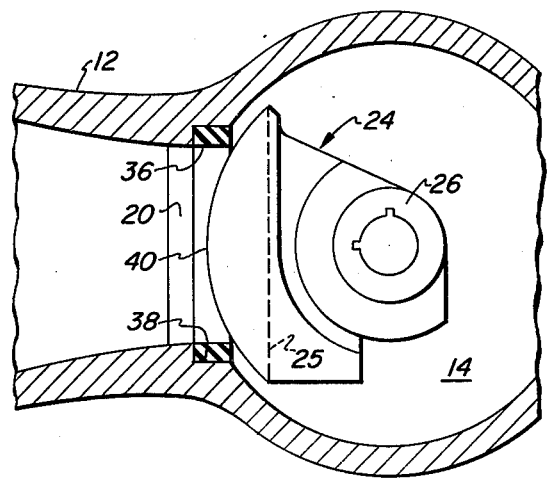
FIGS. 2, 3 and 4 are cut-away top views of the ball valve shown in FIG. 1 at various ball positions.

Referring to FIG. 2, there is shown a cut-away top view of the ball valve. The ball plug 24 is shown in its shut off or zero travel position. In this position, surface 40 extends beyond the seating ring 36 about its entire periphery and only a small amount of fluid is allowed to pass through the valve because of the previously mentioned clearance between surface 40 and seating ring 36.

Figure 3:
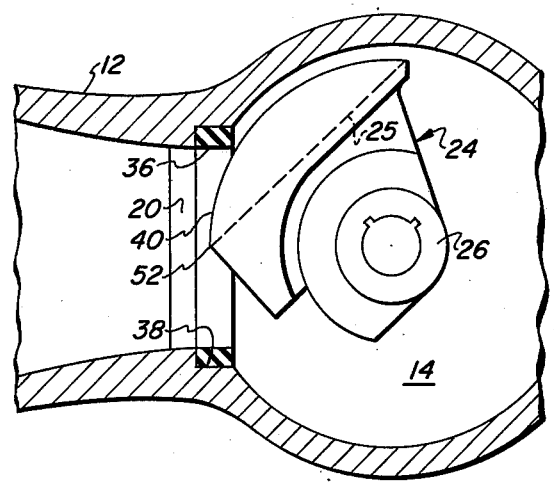

Referring now to FIG. 3, the ball plug 24 is shown in a partially open position corresponding to approximately 50% of the maximum ball plug travel. In this position, surface 40 partially blocks the inner circular aperture 20 so that an edge 52 of surface 40 and a portion of the aperture 20 form an orifice through which the fluid flows. The fluid flowing through the orifice forms a jet and exhibits Vena Contracta with relatively low flow efficiency.

Figure 4:
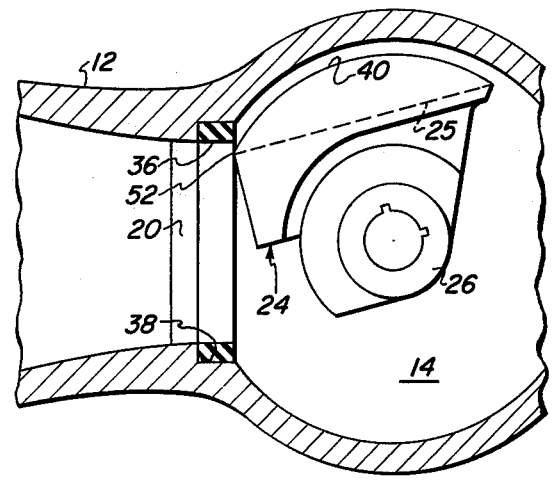

Referring now to FIG. 4, the valve is shown with the ball plug 24 in a substantially full open position corresponding to approximately 95% of the maximum valve travel. In this position, the edge 52 of surface 40 substantially coincides with the periphery of the circular aperture 20 so that the opening does not so nearly represent an orifice. In this position the flow passage of the ball plug, which is partially defined by surface 25, approximates a venturi passage in conjunction with the inlet pipe 12 and the circular aperture 20. In the absence of a baffle the venturi like passage would exhibit a high flow efficiency and would result in wall attachment.

Figure 5:
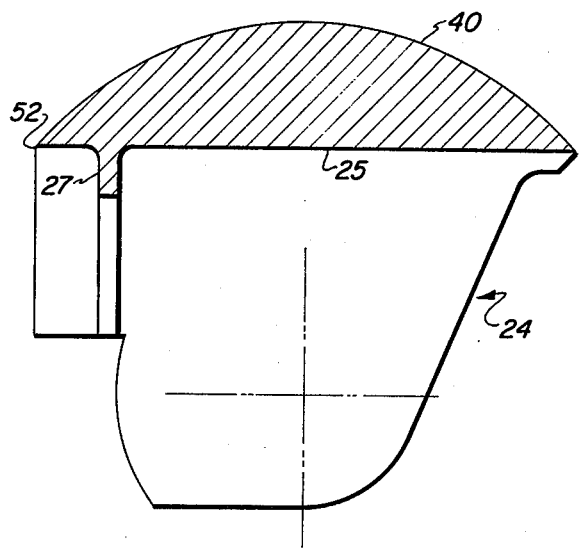
FIG. 5 is a sectional view of the ball taken along lines 5—5 of FIG. 1.

Referring to FIG. 5, there is shown a sectional view of one embodiment of the ball plug 24 in which there is formed a single baffle 27 extending from surface 25 into the flow passage of the ball. It was discovered that the use of a baffle extending into the flow path substantially reduced the tendency for wall attachment and therefore eliminated the sudden increase in flow rate experienced in ball valves of the prior art. While the single baffle eliminated the sudden increase in flow rate, it also had the tendency to reduce the maximum flow capacity of the ball valve resulting in a leveling off of the flow characteristic curve.

The preferred height for baffle 27 depends upon the desired characteristics, the pressure and flow rates for which the valve is designed and therefore must be determined using emperical data.

Figure 6:
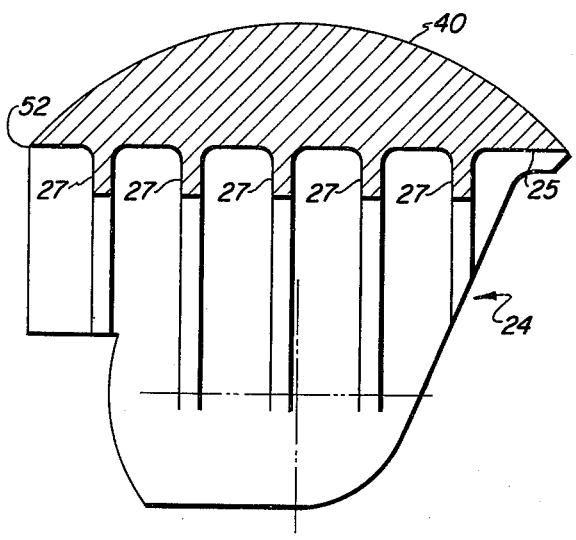
FIGS. 6 and 7 are sectional views of the ball similar to FIG. 5 but showing additional embodiments of the invention.

Referring to FIG. 6, there is shown a sectional view of another embodiment of the present invention wherein a plurality of baffles 27 of equal height are formed on surface 25 and into the flow passage. The multiple baffle arrangement also eliminated the tendency for wall attachment but again resulted in a reduction in the total flow capacity of the valve; however, the reduction in maximum capacity was not as severe as with the single baffle embodiment since the height of each baffle may be substantially less than that for the single baffle embodiment.

Figure 7:
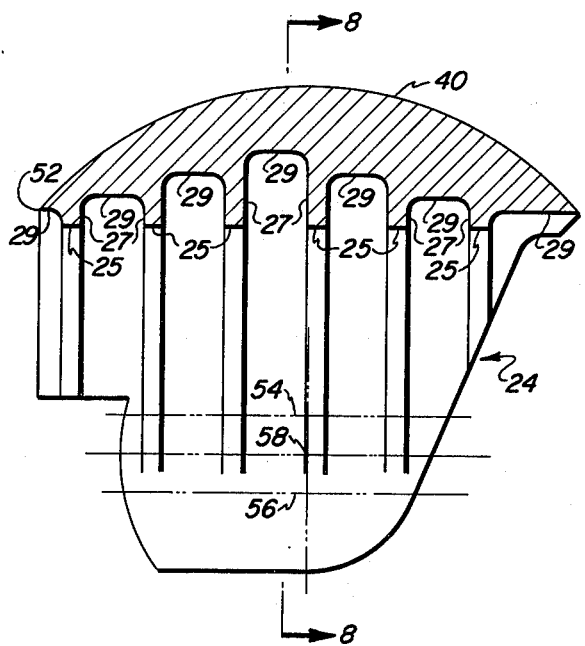

FIG. 7 shows the preferred embodiment wherein a plurality of baffles 27 are provided, said baffles being of varying heights. The embodiment may be more accurately described as having a labyrinth formed in surface 25 said labyrinth being formed of grooves 29 of varying depths. The varying heights of the baffles 27 are provided by forming the labyrinth grooves with varying depths relative to surface 25. The deepest groove being disposed about midway the flow passage with a gradual decrease in depth of successive grooves towards each end of the passage.

Figure 8:
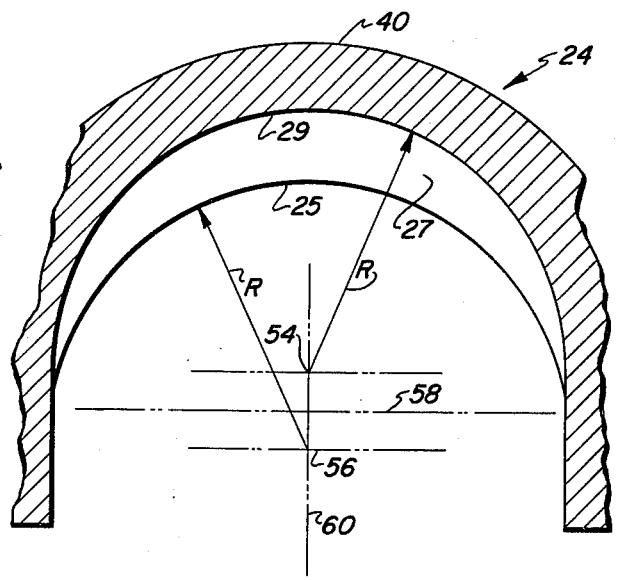
FIG. 8 is a sectional view taken along lines 8—8 of FIG. 7.

While the baffles and grooves of the described embodiments may be formed using any of several state of the art methods the preferred method is to using machining techniques. Referring to FIG. 8 there is shown a sectional view taken along line 8—8 of FIG. 7. It is to be noted that groove 29 is semicylindrical and is formed with a radius R about an axis 54 and that surface 25 is also semicylindrical with a radius R formed about an axis 56 parallel to axis 54. Axes 54 and 56 are disposed on opposite sides of rotational axis 58 of the ball plug 24 and along a line perpendicular to axis 58. By using an identical radius for the grooves 29 and surface 25 the varying groove depths may be provided by merely off-setting the centers of the grooves. If a segmented valve is used access for machining the grooves is provided and the machining operation is simplified since only one radius is used.

Thus, the present invention provides a ball valve having uniform flow characteristics with minimum slope ratios. The sudden increase in flow rate experienced with prior art ball valves has been eliminated through the unique use of baffle arrangements which prevent wall attachment as the ball plug moves from a position simulating an orifice to a position simulating a venturi passage. By preventing wall attachment, the flow characteristics exhibit a uniform gain throughout the entire ball travel and do not jump from the inefficient jet characteristics associated with an orifice to the more efficient streamline characteristics associated with a venturi passage.

The present invention provides a ball valve that may be used at maximum capacity while providing equal percentage characteristics so that the valve may be used for control applications such as the control of recirculating cooling water in nuclear reactors. Since the valve may be used at maximum capacity, it need not be oversized as required for prior art ball valves, thereby resulting in reduced valve cost. The unique use of identical radii for the various groove also substantially reduced the cost of manufacturing the valve.

While the principles of the invention have been described in connection with specific embodiments, it is to be clearly understood that the embodiments are described only as examples and not as limitations to the scope of the invention, as set forth in the objective thereof and in the accompanying claims.

What is claimed is:

1. A control valve of the type having inlet and outlet apertures and a rotatable valve plug with a surface defining a flow passage for communicating with said inlet and outlet apertures, wherein the improvement comprises a plurality of baffle elements each formed on said surface and having first and second surfaces and extending transversely into said flow passage, the surfaces of adjacent baffle elements being spaced apart for controlling fluid flow characteristics through said valve.

2. A control valve, comprising:
a valve casing including an inlet aperture, an outlet aperture and a chamber disposed therebetween;
a valve plug rotatably mounted in said chamber and including a surface defining a flow passage means for permitting a flow of fluid between said inlet and outlet apertures at predetermined rotational positions of said valve plug, the rate of fluid flow corresponding to the rotational position of the valve plug; and
a plurality of baffle elements formed on said surface, each having first and second surfaces extending transversely into said fluid flow passage, the surfaces of adjacent baffle elements being spaced apart for controlling fluid flow characteristics through said valve.

3. A control valve as described in claim 2, wherein the valve plug comprises a ball plug.

4. A control valve as described in claim 2, wherein the valve plug comprises a segmented ball plug.

5. A control valve as described in claim 1, wherein the baffle elements have varying heights.

6. A control valve as described in claim 2, additionally comprising means for rotating said valve plug.

7. A control valve, comprising:
a valve casing including an inlet aperture, an outlet aperture and a chamber disposed therebetween;
a valve plug rotatably mounted in said chamber and including a surface defining a flow passage means for permitting a flow of fluid between said inlet and outlet apertures at predetermined rotational positions of said valve plug the rate of fluid flow corresponding to the rotational position of the valve plug; and
a plurality of spaced groove means formed in the surface defining the flow passage and disposed transverse to said flow passage controlling fluid flow characteristics through said valve.

8. A control valve as described in claim 7, wherein the valve plug comprises a ball plug.

9. A control valve as described in claim 7, wherein the valve plug comprises a segmented ball plug.

10. A control valve as described in claim 7, wherein the groove means form a labyrinth.

11. A control valve as described in claim 7, additionally comprising means for rotating said valve plug.

12. A control valve of the type having inlet and outlet apertures and a rotatable valve plug with a flow passage for communicating with said apertures, wherein the improvement comprises, a plurality of spaced groove means formed in a surface defining the flow passage and disposed transverse to said flow passage for controlling fluid flow characteristics through said valve.

13. A plug for a control valve, said plug comprising: means defining a flow passage; and a plurality of baffle elements formed on said means, each element having first and second surfaces extending transversely into said flow passage, the surfaces of adjacent baffle elements being spaced apart for controlling fluid flow characteristics through said passage.

14. A plug for a control valve, said plug comprising: a surface defining a flow passage; and a plurality of spaced groove means formed in said surface and disposed transverse to the flow passage for controlling fluid flow characteristics through said passage.

15. A control valve, comprising:
a valve casing including an inlet aperture, an outlet aperture and a chamber disposed therebetween;
a valve plug rotatably mounted in said chamber and including a surface defining a flow passage means for permitting a flow of fluid between said inlet and outlet apertures at predetermined rotational positions of said valve plug, the rate of fluid flow corresponding to the rotational position of the valve plug; and
a plurality of baffles formed on said surface each having first and second surfaces and extending into said flow passage, the surfaces of adjacent baffles being spaced apart for controlling fluid flow characteristics through said valve, the baffle means having varying heights with the baffle heights being maximum midway the flow passage means and successively decreasing in height toward the ends of the flow passage means.

16. A control valve, comprising:
a valve casing including an inlet aperture, an outlet aperture and a chamber disposed therebetween;
a valve plug rotatably mounted in said chamber and including a surface defining a flow passage means for permitting a flow of fluid between said inlet and outlet apertures at predetermined rotational positions of said valve plug the rate of fluid flow corresponding to the rotational position of the valve plug; and
a plurality of grooves formed in the surface defining the flow passage for controlling fluid flow characteristics through said valve, said grooves having varying depths, the grooves midway the flow passage means having the greatest depth and the depths of the successive grooves decreasing towards the ends of the flow passage means.

17. A control valve, comprising:
a valve casing including an inlet aperture, an outlet aperture and a chamber disposed therebetween;
a valve plug rotatably mounted in said chamber and including a semicylindrical surface having a predetermined radius, said surface defining a flow passage means for permitting a variable flow of fluid between said inlet and outlet apertures at predetermined rotational positions of said valve plug, the rate of fluid flow corresponding to the rotational position of the valve plug; and
baffle means formed integrally with sand plug valve on said surface and extending into said flow passage, said baffle means having a semicylindrical edge surface with substantially the same predetermined radius for controlling fluid flow characteristics through said valve.

18. A control valve, comprising:
a valve casing including an inlet aperture, an outlet aperture and a chamber disposed therebetween;

a valve plug rotatably mounted in said chamber and including a surface defining a flow passage means for permitting a flow of fluid between said inlet and outlet apertures at predetermined rotational positions of said valve plug, the rate of fluid flow corresponding to the rotational position of a valve plug; and groove means forming a labyrinth in the surface defining the flow passage, said groove means comprising grooves of varying depths for controlling fluid flow characteristics through said valve.

19. A control valve, comprising:

a valve casing including an inlet aperture, an outlet aperture and a chamber disposed therebetween;

a valve plug rotatably mounted in said chamber and including a semicylindrical surface with a predetermined radius for defining a flow passage means for permitting a flow of fluid between said inlet and outlet apertures at predetermined rotational positions of said valve plug, the rate of fluid flow corresponding to the rotational position of the value plug; and groove means formed in the semicylindrical surface, said groove means having a bottom surface that is semicylindrical with substantially the same predetermined radius as the semicylindrical surface forming the flow passage means, whereby the groove means controls the fluid flow characteristics through said valve.

20. A control valve as described in claim 19 wherein the groove means comprises a plurality of grooves having varying depths said grooves being formed with semicylindrical surfaces having equal radii.

* * * * *